US008559383B2

(12) United States Patent
Zetterman et al.

(10) Patent No.: US 8,559,383 B2
(45) Date of Patent: Oct. 15, 2013

(54) MULTIRADIO CONTROL

(75) Inventors: Tommi J. Zetterman, Espoo (FI); Antti Immonen, Helsinki (FI); Aarno Pärssinen, Espoo (FI); Antti Piipponen, Tampere (FI); Mauri Honkanen, Tampere (FI)

(73) Assignee: Nokia Corporation, Espoo (FI)

( * ) Notice: Subject to any disclaimer, the term of this patent is extended or adjusted under 35 U.S.C. 154(b) by 635 days.

(21) Appl. No.: 12/622,593

(22) Filed: Nov. 20, 2009

(65) Prior Publication Data

US 2011/0122829 A1    May 26, 2011

(51) Int. Cl.
*H04W 28/04* (2009.01)
*H04W 72/04* (2009.01)
*H04W 88/08* (2009.01)

(52) U.S. Cl.
USPC ........... 370/329; 370/310; 370/328; 370/345; 370/347

(58) Field of Classification Search
None
See application file for complete search history.

(56) References Cited

U.S. PATENT DOCUMENTS

| 2005/0020299 | A1* | 1/2005 | Malone et al. | 455/552.1 |
|---|---|---|---|---|
| 2006/0135076 | A1* | 6/2006 | Honkanen et al. | 455/67.13 |
| 2007/0206631 | A1* | 9/2007 | Parts et al. | 370/465 |
| 2008/0080455 | A1* | 4/2008 | Rofougaran | 370/342 |
| 2008/0144551 | A1* | 6/2008 | Rakshani et al. | 370/310 |
| 2008/0232448 | A1* | 9/2008 | Baker | 375/219 |
| 2009/0061787 | A1* | 3/2009 | Koller et al. | 455/73 |
| 2009/0180451 | A1* | 7/2009 | Alpert et al. | 370/338 |
| 2009/0201862 | A1* | 8/2009 | Okker et al. | 370/329 |
| 2009/0291701 | A1 | 11/2009 | Zetterman et al. | 455/509 |
| 2009/0318087 | A1* | 12/2009 | Mattila et al. | 455/63.1 |
| 2010/0137025 | A1* | 6/2010 | Tal et al. | 455/553.1 |
| 2010/0329156 | A1* | 12/2010 | Sun et al. | 370/259 |

FOREIGN PATENT DOCUMENTS

WO    WO 2007/132319 A2    11/2007

OTHER PUBLICATIONS

"DigRF Baseband/RF Digital Interface Specification", "Logical, Electrical and Timing Characteristics" EGPRS Version, Digital Interface Working Group, Version 1.12 (31 pages).

* cited by examiner

*Primary Examiner* — Hassan Phillips
*Assistant Examiner* — Gautam Sharma
(74) *Attorney, Agent, or Firm* — Harrington & Smith (57) ABSTRACT

In a non-limiting and exemplary embodiment, a method is provided arranging control of multiple radio systems of a wireless communications device. A second scheduler performs proactive scheduling decisions on the basis of radio resource usage requirements of radio systems of the wireless communications terminal device and sending information on the proactive scheduling decision to a first scheduler. The first scheduler performs reactive scheduling decisions on the basis of the proactive scheduling decision information from the second scheduler.

20 Claims, 8 Drawing Sheets

MULTIRADIO CONTROL

FIELD

The invention relates to arranging control of multiple radio systems of a wireless communications device.

BACKGROUND

Current digital mobile communication devices include a number of radio systems. Coexistence solutions are increasingly needed to control radios in a multiradio device with the aim of minimizing interference between simultaneously active radios. Particularly, when two or more devices operate in the same frequency band, there is mutual interference between the two wireless units that may result in severe performance degradation. Hardware techniques, isolation or filtering, may be applied to reduce such interference, but such techniques may be undesirable due to increased device costs, for instance.

The Institute of Electrical and Electronics Engineers (IEEE) has specified dedicated procedure to enhance co-existence between wireless local area networks (WLAN), specified in the IEEE under 802.11 family, and personal area networks (PAN), such as Bluetooth, specified in the IEEE standard 802.15. This dedicated procedure applies the 2.4 GHz unlicenced band.

Another system for managing simultaneous operation of a plurality of radio modems in terminal device comprises a multiradio controller and a plurality of dedicated radio interfaces, enabling quickly conveying delay sensitive information to and from the radio modems. In response to detecting a potential communication conflict, the multiradio controller may instruct a lower-priority modem to halt communications for designated periods.

BRIEF DESCRIPTION

Methods and apparatuses for multiradio control are now provided, characterized by what is stated in the independent claims. Some embodiments of the invention are described in the dependent claims.

According to an embodiment of the invention, an apparatus is provided, the apparatus comprising: a first scheduler and a second scheduler, wherein the first scheduler and the second scheduler are operatively connected, the second scheduler is configured to perform a proactive scheduling decision on the basis of radio resource usage requirements of at least two radio systems of a wireless communications terminal device, and the first scheduler is configured to perform a reactive scheduling decision on the basis of information on the proactive scheduling decision from the second scheduler.

According to another embodiment, a method is provided for arranging control of multiple radio systems of a wireless communications device, the method comprising: performing, by a second scheduler for a wireless communications terminal device, a proactive scheduling decision on the basis of radio resource usage requirements of at least two radio systems of the wireless communications terminal device, sending information on the proactive scheduling decision to a first scheduler, and performing a reactive scheduling decision on the basis of the proactive scheduling decision information from the second scheduler.

The invention and various embodiments of the invention provide several advantages, which will become apparent from the detailed description below.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
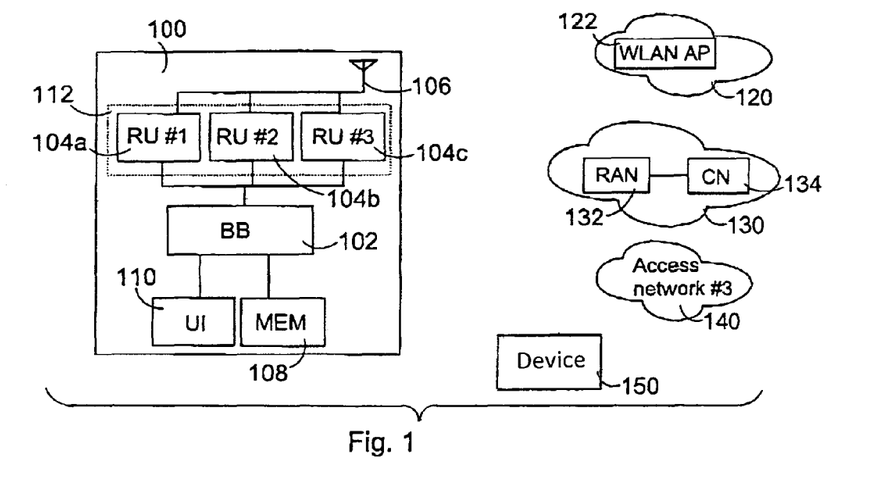
FIG. 1 illustrates a communications system according to an embodiment.

As illustrated in the simplified FIG. 1, a multimode capable wireless communications device 100, hereafter referred to as a mobile station (MS) 100, typically comprises a baseband part 102 and a plurality of radio units or modules 104a, 104b, 104c, such as cellular RF units, required to provide a plurality of radio systems in the MS 100. The baseband (BB) part 102 may be implemented by at least one chipset with one or more processors. It is to be noted that current multiradio devices typically have multiple baseband modules, which may form the BB part 102 illustrated in FIG. 1. Alternatively, there could be a single baseband unit, such as a multi-core vector processor sub-system capable of performing baseband computation of multiple radio systems simultaneously. The radio units 104a-c may be implemented by one or more RF ICs 112. The radio units 104a-c are connected to an antenna 20. It will be appreciated that more than one antenna may be applied. The MS 100 typically also comprises user interface components 110, such as a display and a keypad, and memory 108.

As further illustrated in FIG. 1, a plurality of networks 120, 130, 140 may be available in a given geographical area for the MS 100. The networks 120-140 serve as access points to further services and networks, such as the Internet.

The MS 100 typically comprises a radio system with one or more radio units 104a-c for cellular, long-range communications. The network 130 may be a cellular network comprising a radio access network (RAN) 132 and a core network (CN) 134. The MS 100 may be arranged to support communications with a network system standardized by the Third Generation Partnership Project (3GPP) or the Third Generation Partnership Project Two (3GPP2), for instance. A 3GPP based network may comprise a GSM access network (Base Station Sub-system BSS), a Wideband Code Division Multiple Access (WCDMA) access network, and/or an Evolved UMTS Radio Access Network (E-UTRAN), for instance. Further, 3GPP based network may comprise a core network supporting General Packet Radio Service (GPRS) and/or and Long Term Evolution (LTE) core network, for instance.

The MS 100 may comprise a radio unit 104a-c to communicate with a wireless local area network WLAN 120, such as IEEE 802.11 based network comprising a wireless access point 122. The MS 100 may be configured to arrange near-field communications with single access points or other wireless communications devices 150. Some other examples of short-range wireless communications technologies include Bluetooth®, ultra-wide band (UWB), and wireless USB.

The MS 100 may comprise a radio unit 104a-c to support communications with further networks 140. For instance, the MS 100 may be configured to receive broadcast communications, such as Digital Video Broadcasting-Handheld (DVB-H) broadcasts. The MS 100 may be provided with a receiver to receive satellite transmissions, such as Global Positioning System (GPS) signals.

In one embodiment at least some of radio communications features of the MS 100 are provided by means of software defined radio (SDR). In an embodiment the MS 100 is configured to support cognitive radio features for automatically changing between access networks. For instance, the MS 100 may be support cognitive radio features according to Evolved LTE standards by the 3GPP.

However, it will be appreciated that the application of the present embodiments is not limited to application of any particular radio system, and presently disclosed multi-radio scheduling features may be applied with any suitable current or future standard or non-standard wireless communication radio systems.

In order to control co-existence of different radio access systems, the MS 100 may comprise a multi-radio controller (MRC). Such MRC may function as a scheduling service controller for providing protocol level radio access scheduling services for a plurality of radio access systems over a predefined control interface. When a radio system needs to receive or transmit, it asks for air access time by sending a schedule request to the MRC. The MRC collects requests from different radio systems, solves possible interoperability problems and sends decisions back to the radio systems. Such MRC may be implemented by protocol software executed by a processor of BB 102, for instance. The use of such multi-radio scheduling enables more efficient radio resource usage.

However, there is a need to further develop multiradio control. Some radios are not well predictable or not predictable at all, which makes it difficult to connect them to the multiradio controller requiring scheduling information in advance. For instance, in WLANs 120 the main system control lies in the access point 122. Some radios have features requiring fast response time, meaning that the MRC needs to assume worst-case resource allocation. For instance, in case of LTE Hybrid Automatic Repeat Request HARQ the MRC needs to assume that the HARQ always takes place. This potentially leads to unnecessary idle resources in case the activity does not actually take place. Furthermore, there may be substantial differences between scheduling time scales between different radio chipsets, causing problems for scheduling by the MRC.

Figure 2:
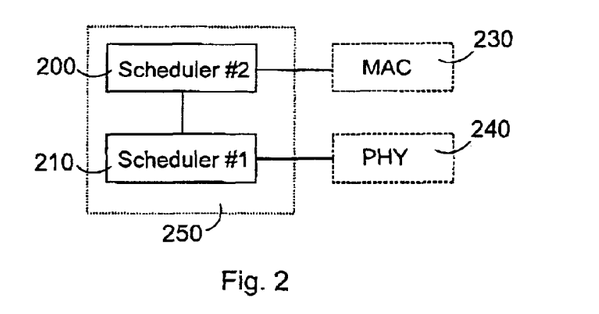
FIG. 2 illustrates a scheduling arrangement according to an embodiment.

FIG. 2 illustrates conceptual architectural elements for an apparatus according to an embodiment. For instance, the apparatus may be the MS 100 illustrated in FIG. 1. The apparatus comprises a second scheduler 200 configured to perform proactive scheduling, which may also be referred to as protocol level scheduling. Such proactive scheduling is to be broadly understood to refer to scheduling of radio systems on the basis of planned behavior regarding radio resource usage of at least two radio systems, which typically can negotiate with a scheduler about their future behavior. Thus, the second scheduler 200 may be referred to as a proactive scheduler. As also illustrated in FIG. 2, the second scheduler 200 can be considered as a MAC layer, i.e. part of the OSI layer two protocol model, scheduler communicating with MAC layer protocol parts of radio systems.

A first scheduler, operationally connected to the second scheduler 200, is configured to perform reactive scheduling decisions, which may also be referred to physical level scheduling decisions, on the basis of scheduling decision information from the second scheduler 200. The first scheduler 210 may be referred to as a reactive scheduler, which is to be broadly understood to refer to a scheduler performing scheduling to react to some specific action. For instance, such action may be a transmission need which cannot be predicted early enough beforehand in order to be scheduled by the second scheduler 200. Another example of an action, which may be arranged to trigger reactive scheduling, is detection of a decision of a radio system to not use a resource allocated for it. Reactive scheduling decisions are typically highly time-critical, and reactive scheduling may be used for addressing scheduling needs which are developed on the basis of the decisions of the second scheduler 200. The first scheduler 210 may also be considered as a physical layer 240 scheduler. The first scheduler may thus be configured to schedule radio resources, which are available for scheduling after the scheduling decisions of the second scheduler 200. The first scheduler 210 may be configured to schedule any "last-millisecond" requests using the information from the second scheduler 200 as a baseline.

The first scheduler 210 may be configured to perform the physical level scheduling for radio systems which cannot be predicted, such as WLAN radios, or for some other reason cannot connect to the protocol level scheduling framework. For instance, a radio may be located on a third-party legacy module requiring specific handling.

Hence, a multifaceted hierarchical scheduling control arrangement is provided, which can be used to provide scheduling services for various types of current and future radio system(s)/protocol(s) supported by wireless communications devices, such as one or more of the above-mentioned standards and their extensions.

Such control arrangement may be used to minimize interference between simultaneously active radio systems, to optimize the quality of radio connections and to enable resource sharing between simultaneously used radios. It is possible to achieve better scheduling results with co-operative schedulers 200, 210 than what would be possible by either scheduler functioning alone. The second scheduler 200 can be arranged to be more future-oriented. The first scheduler 210 may instead be arranged to receive pre-processed decisions, which lightens the computation load of the first scheduler 210, helps it to meet tight real-time constraints, and allows to delay the final scheduling decision to a point of time more information is available for scheduling.

Thus, the present arrangement addresses the challenge of combining multiple radios, with different capabilities of forecasting their future operation and resource needs (spectrum, computation and/or hardware), to work under a common control framework.

It is to be appreciated that application of two schedulers is just one embodiment of the present scheduling control arrangement. There may be three, four, or even more schedulers, assigned to carry out certain scheduling tasks. However, for conciseness reasons, the following description will concentrate on embodiments of applying two schedulers, but features illustrated below may be carried out by three or more schedulers. For instance, there could be two proactive second schedulers 200, each assigned with specific types of scheduling tasks. Furthermore, as will be further illustrated, there may be multiple instances of a reactive scheduler 210.

Figure 3:
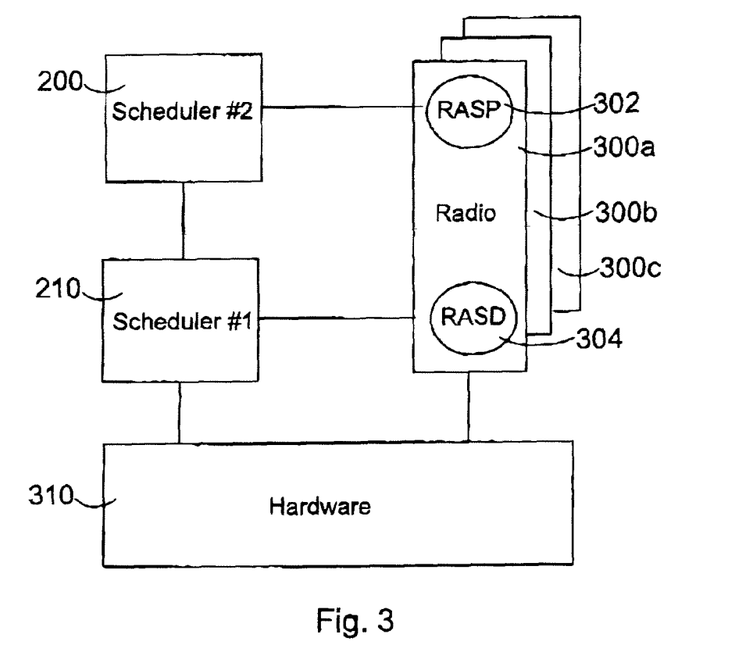
FIG. 3 illustrates conceptual architectural elements for an apparatus according to an embodiment.

FIG. 3 illustrates an example for implementing a hierarchical multiradio controller scheduler arrangement in an apparatus, such as the multimode MS 100. A radio or radio system 300a, 300b, 300c may be divided into two functional parts: A radio access system protocol (RASP) 302 represents a (MAC) protocol part or functional module and a radio access system device (RASD) 304 represents the baseband computation and low level control part or module of a radio system 300a-c. The term "radio system" in a wireless communications terminal device, as used herewith, generally refers to features in a device capable of acting as a terminal for arranging communications over a radio connection, and is not limited to the example arrangement of FIG. 3. With reference to FIG. 1, a radio system 300a-c in a wireless communications device may be implemented by a radio unit 104a-c and appropriate features of the baseband 102 part (such as cellular protocol processing), or as a specific third-party radio system chip, for instance.

The RASP 302 informs the second scheduler 200 of its predicted activity pattern and receives scheduling decisions from the second scheduler 200. The second scheduler 200 sends information on its scheduling decisions also to the first scheduler 210. The first scheduler 210 addresses any further required scheduling tasks based on the information it gets from the RASD 304. The first scheduler 210 may then realize these decisions, for instance by blocking hardware 310 access or controlling a coexistence interface in hardware 310. In some embodiments there is a specific first scheduler 210 for each of the radio systems 300a-c, and such first scheduler may be implemented on a radio system's RF chip. However, the first scheduler may be arranged to provide scheduling for two or more different radio systems 300a-c.

The first scheduler 210 and the second scheduler 200 may be arranged on a single apparatus 250 or they may be provided by separate apparatuses. Such apparatus, comprising the first scheduler 210 and/or the second scheduler 200 may be a chipset suitable for use wireless communications apparatus, such as the MS 100.

An embodiment of such apparatus comprising the first scheduler 210 and/or the second scheduler 200 is a wireless communications apparatus, such as the MS 100 of FIG. 1. In general, various embodiments of such wireless communications apparatus can include, but are not limited to, cellular telephones, personal digital assistants (PDAs), portable computers, imaging devices, gaming devices, music storage and playback appliances, Internet appliances permitting Internet access and browsing, as well as other portable units or terminals that incorporate wireless communications functions.

The apparatus may be implemented as an electronic digital computer, which may comprise memory, a processing unit with one or more processors, and a system clock. The processing unit may be controlled by a sequence of program instructions transferred to the processing unit from the memory. An embodiment provides a computer program embodied on a non-transitory computer-readable storage medium. Such computer program comprising one or more sequences of one or more instructions which, when executed by one or more processors of the apparatus, cause the apparatus to perform at least some of the present multi-radio scheduling related features by the first scheduler 210 and/or the second scheduler 200 illustrated in connection with FIGS. 2 to 13. In an embodiment such computer program code is stored in at least one memory of the apparatus, for instance in memory 108 of the MS 100. The memory and the computer program code are configured, with at least one processor of the apparatus, to provide means for and to cause the apparatus to perform at least some of the scheduling related features by the first scheduler 210 and/or the second scheduler 200, further illustrated below in connection with FIGS. 4 to 13.

At least some of the features of the apparatus illustrated further below could be implemented by hardware. A hybrid of hardware and software implementations is also feasible. Some further implementation examples are illustrated later in connection with FIGS. 8 to 13.

Although the apparatus has been depicted as one entity, different units and memory thereof may thus be implemented in one or more physical or logical entities. Some further embodiments of such apparatus(es) are illustrated further in connection with FIGS. 4 to 13. In particular, means may be provided for arranging at least some of the steps and features illustrated in connection with FIGS. 4 to 13.

Figure 4:
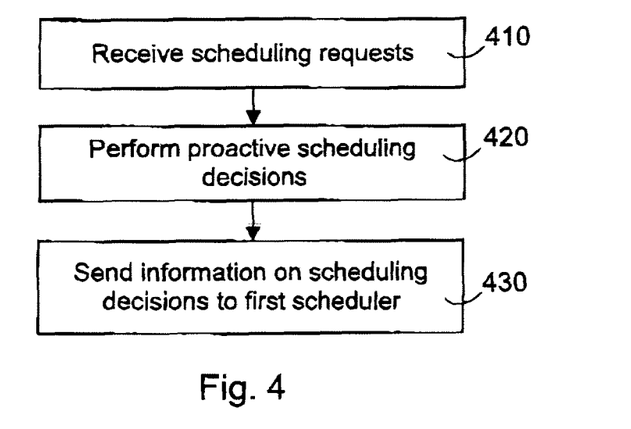
FIG. 4 illustrates a method for a second scheduler according to an embodiment.

Let us now further study the actions of the schedulers 200, 210. FIG. 4 illustrates a method according to an embodiment. These steps, illustrated in a simplified form, may be applied by the second scheduler 200 as main steps related to the present hierarchical scheduling arrangement.

When a radio system 300a-c needs to receive or transmit, it asks for air access time by sending a schedule request to the second scheduler 200. The second scheduler 200 collects 410 requests from different radio systems 300a-c, performs proactive scheduling decisions 420 and solves possible interoperability problems, and sends decisions back to the radio systems. For instance, requested transmission or reception time(s) of a request is compared to already allowed transmission or reception times, but also further parameters may be taken into account. If there is no reservation in the overall radio access schedule for the requested time slot, i.e. no other radio system needs access at the requested time slot, the request may be directly granted. If there is at least a partial overlap, the request or a lower-priority reservation may be rejected, or further radio access related control action may be initiated.

The second scheduler 200 may maintain an overall radio access schedule specifying information on scheduled radio transmissions of the radio systems. The second scheduler 200 sends 430 information on the scheduling decisions to the first scheduler 210. The step 430 may be carried out in response to a request from the first scheduler 210, in response to performing one or more scheduling decisions, or some other trigger. This information may be provided in various forms, depending on the applied interface applied between the first scheduler 210 and the second scheduler 200. For instance, the overall radio access schedule or indications of the decisions may be sent.

Figure 5:
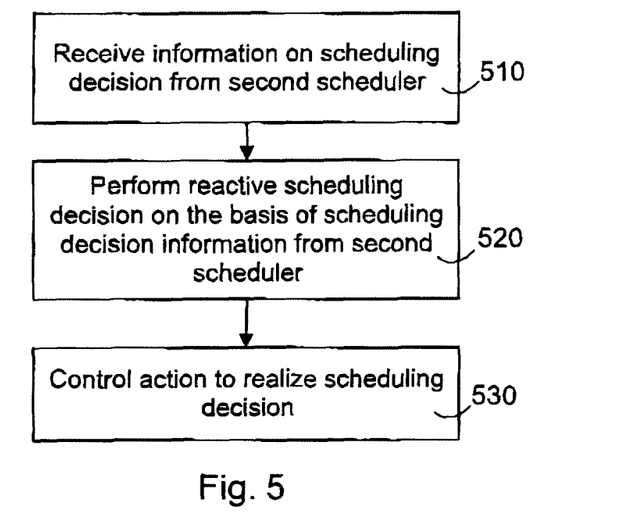
FIG. 5 illustrates a method for a first scheduler according to an embodiment.

FIG. 5 illustrates a method according to an embodiment. These steps, illustrated in a simplified form, represent main operations, which may be applied by the first scheduler 210. In step 510 information on scheduling decisions is received from the second scheduler 200. In step 520 need for any reactive scheduling decisions is detected and one or more reactive scheduling decisions are made. For instance, the first scheduler 210 may be configured to perform a scheduling decision reactive to detecting an indication of unplanned transmission, such as WLAN transmission, or a decision of a radio system regarding the use of a radio resource. The first scheduler 210 may detect the need for performing a reactive scheduling decision on the basis of further information from a radio system 300*a-c*, from an interface to a RF unit, from another first scheduler, and/or the second scheduler 200, for instance. In step 530 an action is controlled to execute the reactive scheduling decision. For instance, access to the hardware 310 is blocked or a request for blocking a radio access unit operation is sent. It is to be noted that there may be a further controller to perform step 530 on the basis of the decision of the first scheduler 210.

In an embodiment one or more of the steps in FIGS. 4 and/or 5 represent an operational unit or module of an apparatus. For instance, an apparatus encompassing the second scheduler 200 comprises a receiver to receive 410 a scheduling request from a radio system 300*a-c*, a scheduler for providing proactive radio access scheduling services by performing proactive scheduling decisions 420, a sender to send 430 a response for the scheduling request to the radio system 300*a-c* and/or the information on the scheduling decision to the first scheduler 210.

In one embodiment, an apparatus encompassing the first scheduler 210 may comprise a receiver to receive 510 the information from the second scheduler 200, a scheduler to perform any required reactive scheduling decisions 520, and a controller in charge executing or controlling another unit to execute a physical level action 530 in accordance with the scheduling decision.

A number of ways and algorithms exist and may be developed to implement multiradio access scheduling 420, and such algorithms need not to be described in detail herein. The second scheduler 200 thus generally compares the predicted behavior of different radio systems to detect conflicts. A conflict generally means that two or more radio systems plan to operate at the same time, but their simultaneous operation cannot be performed, because of spectral interference or resource sharing conflict between the radio systems, for instance. The second scheduler 200 may solve the conflict by denying a lower priority radio system operation. In one embodiment the second scheduler 200 may be arranged to perform a rescheduling operation by delaying or moving an operation period of one or more radio systems (if the radio protocol in question allows this). The second scheduler 200 may be arranged to modify radio operation parameters to allow simultaneous co-operation (if allowed by the radio protocol(s)), for instance. With the present scheduling arrangement, the second scheduler 200 can be dedicated to negotiate with radio protocol stacks 302 well in advance so that there is time to make these decisions.

It should be noted that it is not necessary to receive a specific request 410 from a radio system to perform a proactive scheduling decision regarding the operation of such radio system. In one embodiment the second scheduler 200 is arranged to perform scheduling also for legacy radio systems, which are not capable of sending scheduling requests to the second scheduler 200. The second scheduler 200 needs to obtain the reception and transmission times of such radio system in some other way. For instance, a GSM radio system is highly predictable with its pre-determined frame structure. The second scheduler 200 can be arranged to detect behavior of such radio system and try to match expected behavior to known traffic patterns.

In some embodiments the second scheduler 200 is thus arranged as a proactive multi-radio controller (MRC) providing proactive radio access scheduling service for radio systems 300*a-c* over a predefined control interface on the basis of a set of radio independent scheduling parameters. In another embodiment the second scheduler 200 is arranged to receive requests with radio system specific parameters.

From the point of view of scheduling, radio communication may be classified into a plurality of categories, such as periodic, continuous, and single: Periodic classification means that radio operation (transmission or reception) is repeated at fixed intervals. Continuous classification is for radio operation which is active continuously or for a long time compared to scheduling time, for instance an FM radio receiver. Single classification is used to schedule occasional, non-periodic operations. Each radio system 300*a-c* may be configured to select an appropriate category for a scheduling request being generated and specify the scheduling request category in a scheduling request. The second scheduler 200 may be arranged to process the scheduling requests in accordance with such category information, and serve a received scheduling request 410 in accordance with its category.

At least some of the scheduling requests 410 or scheduling request categories may be prioritized. The priority associated with the request (category) may affect the processing (420), processing order of the requests, and/or reactive scheduling 520 by the first scheduler 210. The second scheduler 200 may be arranged to check priority information associated with the received scheduling request. The priority information may be explicitly included in the scheduling request, or it can be derived on the basis of the scheduling request category, for instance.

A specific time window may be defined for each of the categories of scheduling requests. The second scheduler 200 may be pre-specified with or dynamically allocate arrival time(s) or time window(s) scheduling request category specifically and may be arranged to apply such time windows when receiving 410 scheduling requests. A radio system 300*a-c* may be informed of or pre-specified with timing information on scheduling request categories and send a scheduling request in a time window allocated to the category of the scheduling request. In another embodiment, the radio systems may send scheduling requests when necessary, and the second scheduler 200 handles received scheduling requests by applying a scheduling request processing or serving algorithm, for instance causing processing of the requests in a predefined order and/or within a pre-specified time window.

Some further features for arranging an MRC serving a plurality of radio units are described in U.S. patent application Ser. No. 12/222,646, incorporated herein as a reference. The second scheduler 200 may be configured to perform one or more of the further MRC features in this reference. Additionally, the radio units 104*a-c* may be configured to perform at least some of the features of the radio access units 12, 14 of this references. For instance, such features may be additionally applied to arrange the interface between the radios 104*a-c* and the second scheduler 200, to arrange delivery of protocol level scheduling requests and responses.

In some embodiments the first scheduler 210 also sends information to the second scheduler 200. In one embodiment the first scheduler 210 informs the second scheduler 200 on scheduling decisions performed by the first scheduler 210. The first scheduler 210 may also be configured to inform the second scheduler 200 of unexpected conflicts.

For instance, the second scheduler 200 sends 430 a schedule to the first scheduler 210, the schedule still containing some undecided time slots, such as HARQ slots. Once the first scheduler 210 has solved the undecided time slots, it may report these decisions back to the second scheduler 200. Thus, the second scheduler 200 may be provided by information on how the radios actually performed, which may help the second scheduler 200 in adapting to changing operating conditions. In another example, in case two radio systems happen to contradict the schedule by the second scheduler 200, the first scheduler 210 can report this breaking of the agreed schedule.

In some embodiments the second scheduler 200 is configured to perform conditional grant decisions. Conditional granting refers to granting a radio time slot for a higher-priority radio system such that a lower-priority radio system may use the time slot if the higher-priority radio system does not use the time slot. Such conditional grant decision may be made when there is a conflict between multiple radios, and at least one of the radios has indicated in its scheduling request that the operation takes place based on some condition which will be known later. Some examples of such requests include LTE HARQ, requested only if reception was erroneous, transmission of a WLAN acknowledgement from a radio system only if the received packet was directed to that radio system, and a Blue-tooth Extended Synchronous Connection (eSCO) retransmission is carried out only if the original packet was lost.

Thus, in addition to indicating if radio time slots are granted or denied, the second scheduler 200 may also be arranged to indicate 430 a radio time slot to be "conditionally granted". In one embodiment the first scheduler 210 is arranged to, in response to receiving information on a conditional grant decision, determine if a higher-priority radio system is going to use it. The first scheduler 210 may be arranged to perform a reactive scheduling decision by granting the radio time slot for a lower-priority radio system, in response to detecting that the higher-priority radio system is not going to use the radio time slot.

Conditional grant decisions may thus be further divided into at least two categories. For instance, the second scheduler 200 may decide for a highest-priority radio system a radio time slot a "prioritized conditional grant", which may also be referred to as "primary conditional grant", which means that the radio system may use the time slot if it needs it. An example of another type of conditional grant decision is a "secondary conditional grant", which means that a radio system may use the time slot if a higher-priority radio system issued with a prioritized conditional grant is not using the resource at the same time. The prioritization may be based on radio priorities, for instance.

The second scheduler 200 may be arranged to send a conditional grant for all radio systems 300a-c requesting simultaneous conditional access and for a highest-priority radio system requesting non-conditional access at the same time (if such request exists). The highest-priority radio system is allocated with the prioritized conditional grant, and the other radio systems are allocated secondary conditional grants. In other words, the primary conditional grant guarantees a radio resource if the highest-priority radio system later happens to need it, while the secondary conditional grant means that a further confirmation(s) from higher priority radio(s) not using the resource is(are) needed. Also the secondary conditional grants may be set in priority order. For instance, there may be a "tertiary conditional" request allocated for a third radio system, enabling the third radio system to use the time slot in case the two radio systems with higher priorities are not going to use the time slot. The conditional grants could also be referred to as first (corresponding with the prioritized conditional grant), second, third etc. according to their priority.

Figure 6:
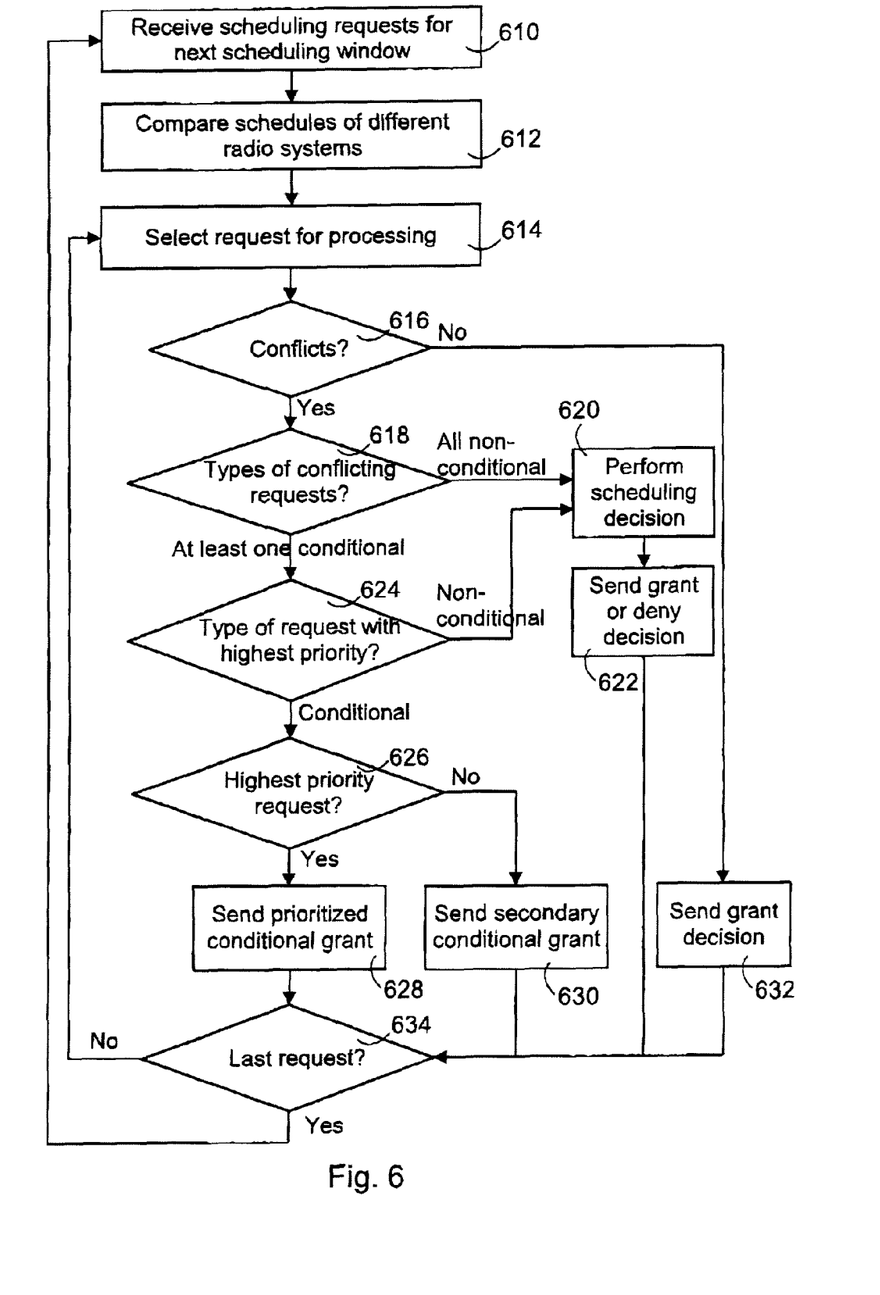
FIG. 6 illustrates another method for a second scheduler according to an embodiment.

FIG. 6 illustrates decision making procedure according to an embodiment. The procedure of FIG. 6 may represent further details of the main operations 410 to 430 of FIG. 4 by the second scheduler 200. Scheduling requests for a scheduling window being considered are obtained 610 from radio systems 300a-c. The schedules of different radio systems are compared 612 and a request is selected 614 for processing.

The procedure checks if there are any request(s) in conflict with the request being processed 616. If no conflicting requests exist, the request may be granted and grant decision may be sent 632 to a respective radio system. If there are conflicts, the procedure checks 618 types of a set or "bundle" of conflicting requests. In particular, it is checked if all the conflicting requests are non-conditional or if there is at least one conditional request. If all conflicting requests are non-conditional, in step 620 a scheduling decision is made, for instance on the basis of priorities of the radio systems or scheduling requests. A grant or deny decision is then sent in step 622.

If there is at least one conditional request, in step 624 the procedure checks the type of a request with highest priority among the conflicting requests, and in particular if the type is conditional or a non-conditional. If conditional, the procedure checks 626 if the request being processed is the highest priority request in the bundle of conflicting requests. If yes, a prioritized conditional grant scheduling decision is made and information on this decision is sent 628. If no, a secondary conditional grant decision is made and information on this decision is sent 630.

In step 634 the procedure checks if there are any further pending requests for the scheduling window. If there is at least one pending request, the procedure returns to step 614 and selects a next request for processing. If the processed request was the last one for the scheduling window, the procedure may return to step 610.

In one embodiment flexible scheduling is applied in order to attempt to find a non-conflicting schedule, i.e. to perform a rescheduling operation to remove the conflict. The second scheduler 200 can be arranged to perform flexible scheduling operations, such as moving, delaying and selecting of radio time slots. A flexible radio system provides to the second scheduler 200 the length (duration) of a transmission or reception operation and possible start times. Auxiliary information provided can include the carrier frequency and minimum output power, for instance. The second scheduler 200 then decides which of the possible start times shall be used for the operation, and may opt to set a limit to the output power. The list of possible start times given by the flexible radio system can be replaced by a start time window, during which the operation must start. The second scheduler 200 can then decide exactly when the operation shall start. The second scheduler 200 can also grant multiple start times, or a start time window, and let the flexible radio system decide when the operation shall start. The flexible radio system may also include priority info in the list of possible start times, by preferring a particular start time, for instance.

In a further embodiment such flexible scheduling is applied after step 624 of FIG. 6. For instance, if the result of check 624 is conditional, there may be an additional step for checking the request type of the request being processed. If the type of the request being processed is non-conditional, a flexible scheduling operation appropriate for the present situation may be performed. If a non-conflicting schedule is found, the procedure makes a grant decision on the basis of such schedule. If a non-conflicting schedule is not found, the procedure may send a secondary conditional grant decision.

Figure 7:
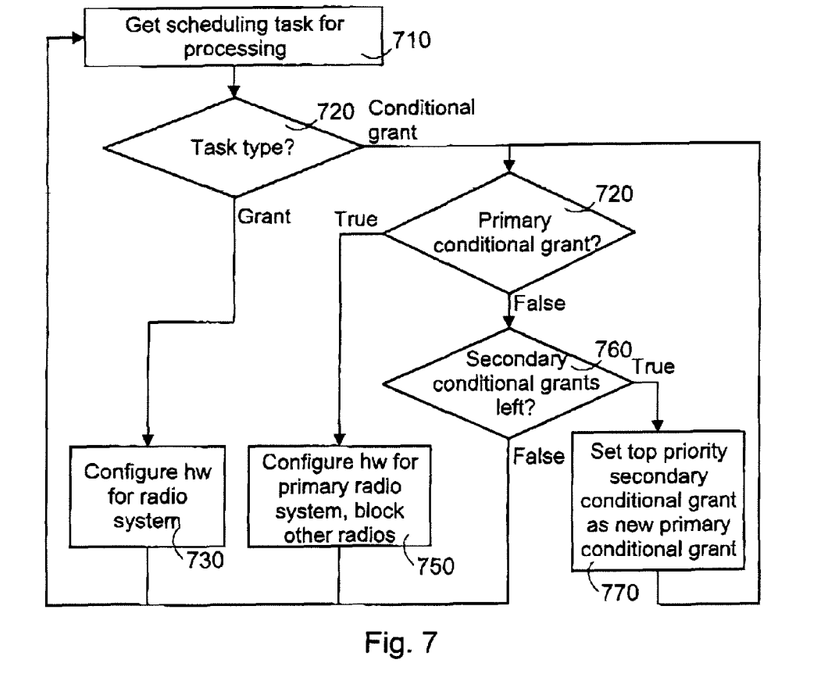
FIG. 7 illustrates another method for a first scheduler according to an embodiment.

FIG. 7 illustrates a method according to an embodiment. The steps illustrated in FIG. 7 may be applied by a first scheduler 210 performing reactive scheduling decisions 520 on the basis of decisions of the second scheduler 200. In step 710 the procedure starts to process a (next) pending scheduling task for a given radio time slot. The type of the task is checked 720. If the task type is grant, the hardware 310 may be configured accordingly for operation of the respective radio system. If the task type is conditional, the procedure checks 740 if a primary conditional grant operation is required for a radio system 300a-c. If yes, the hardware 310 may be configured to enable access for such prioritized radio system, and access for the other radio systems may be blocked. If there is no primary conditional grant operation required, it is checked if there are any pending secondary conditional grants for the time slot. If yes, the most prioritized secondary conditional grant is set 770 as a new primary condition grant, and step 740 may be entered.

The updating of overall radio access schedule(s) and delivery 430, 510 of information on scheduling decisions are not explicitly disclosed in FIGS. 6 and 7. However, as already indicated, these steps may be carried out in various ways. For instance, the second scheduler 200 may be arranged to instantly inform the first scheduler 210 on a decision in connection with step 622, 628, 630, 632, or inform the first scheduler 210 later.

In one example, a prioritized conditional grant for a HARQ slot is assigned 628 for an LTE radio system and a secondary conditional grant is assigned 630 for a conflicting Bluetooth (BT) radio system for a transmission slot overlapping with the LTE HARQ slot. The first scheduler 210 may receive an indication from the LTE radio system if HARQ is required. Based on this indication, the first scheduler 210 allows or denies 530, 750 the conflicting BT radio system to perform its transmission. Technically this can be implemented by controlling deactivation of a power amplifier of the BT radio system when the LTE system is performing HARQ, or by controlling a co-existence interface of a BT chip to disable BT transmission, for instance. If hardware has to be reconfigured before the operation takes place, the first scheduler 210 may instantly initiate this new configuration.

In another example present scheduling features are applied for arranging as legacy BT-WLAN coexistence. The second scheduler 200 may be arranged to decide 628 prioritized conditional grants for sending of WLAN acknowledgement packets and secondary conditional grants 630 for Bluetooth operations. Near real-time signaling is used to block a BT system and allow WLAN radio communications in case a WLAN acknowledgement needs to be transmitted. During a normal operation, the BT radio system may be assigned with primary conditional grant for operation. If it does take active time slots, the WLAN system operations are blocked.

There are various embodiments for defining and detecting transmission TX and reception RX times by the schedulers 200, 210. It is possible to do all scheduling for cellular radio systems at the BB side 102, by relying on the fact that the BB-RF interface latency can be tested and used in the scheduling of TX tasks. If needed, RX reception and TX transmission times can be defined on the basis of commands that set the RX and TX on and off at the desired time.

In one embodiment an implementation using time accurate strobe (TAS) messages or other messages that can carry accurate time information in transmission is applied. In this case, the TAS messages sent over the BB-RF interface carry the information on the TX transmit times. The payload of the TAS messages can be implementation specific. Thus, triggering mechanisms of TAS messages carrying the TX timing information can be implemented by a decoder located in or with the first scheduler 210 of the cellular RF-IC. The timing information can be further used by the first scheduler(s) 210 to allow or deny transmission of a lower-priority system.

For instance, in case if a TAS message not affecting to conditional grant messages is sent, or no TAS message is sent prior to the conditional grant message's TX time, no information is required to be sent to the first schedulers 210. If the triggered TAS message shows that some of the conditional grant messages should be blocked, then the implementation options are the following: A decoder initiates a blocking scheme. Alternatively, the information from the decoder is read into a first scheduler 210 of a cellular radio system, which may then initiate the blocking scheme or send a blocking request to a relevant other first scheduler 210. Thus, in one embodiment there may be an interface between first schedulers 210.

If two or more radio systems 310a-c are located on the same chip, then more aggressive timing in reactive scheduling by the first scheduler 210 can be utilized. This is since the blocking can be done rapidly in case it is initiated by the same first scheduler 210 who gets the information from the decoder.

If the radio systems 310a-c are located on separate RF chips, then the time between sending a TAS message over the BB IC-RF IC interface and a corresponding TX start time has to be set long enough to ensure time for conveying 530, 730 the blocking control information to the chip where lower priority system locates. There are many implementation options available to arrange the blocking, for example some of the TX components, such as a power amplifier and digital-analog converter, may be switched into a standby mode.

Future cognitive radio systems benefit from their consciousness about radio environment. The present scheduling features allow to further improve operations flexibly in different time scales, and together with existing legacy radio systems. For example, the second scheduler 200 can support long-term decision making of cognitive radio system in a multiradio environment, while the first scheduler 210 enables the fast response to changing situations based on conditions measured just before an operation takes place.

In one embodiment, the present scheduling features are applied to support execution of multiple instances of a radio system. For instance, the MS 100 could support a WLAN-based cognitive radio system with instances sharing a common hardware and connected to different access points and/or devices. A priority of a radio system instance is dictated by an application using the radio system instance. The first scheduler 210 may be arranged to use this priority information to make reactive scheduling decisions and implement a correct hardware configuration based on the decisions.

In one embodiment, the present scheduling arrangement is arranged to enable one or more of the radio systems to be prioritized dynamically. This may be arranged by modifying control parameters of the first and/or second scheduler. For instance, if an ongoing voice over IP (VoIP) connection is roamed from a cellular radio system to a WLAN system, radio priorities can be dynamically changed to favor the WLAN system over the cellular radio system in scheduling. The second scheduler 200 can thus be arranged to grant 632 a prioritized conditional access for the WLAN to guarantee the quality of the IP call.

The above embodiments, such as the conditional scheduling, represent only some examples enabled by the present scheduling arrangement applying proactive and reactive schedulers. Various information available on the basis of a radio system behavior later than what the second scheduler 200 is able to handle may be applied by the first scheduler 210 to perform reactive decisions.

FIGS. 8 to 12 illustrate some further embodiments related to implementing the schedulers.

Figure 8:
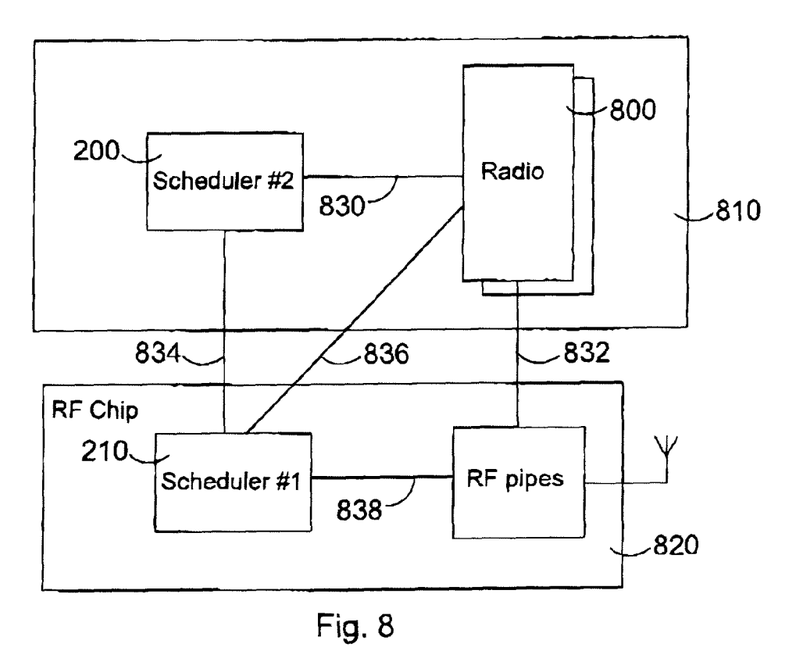
FIGS. 8 to 11 illustrate apparatuses according to some embodiments.

In some embodiments the first scheduler 210 is implemented on a radio system chip. In the example of FIG. 8 the second scheduler 200 is located on a chip 810 running protocol code of SDR radios 800, which may be referred to as an SDR chip. The first scheduler 210 is located on another chip 820 comprising actual RF hardware, referred to as an RF chip. In this setup, communication links exist for: a) protocol level scheduling 830 between SDR radios and the second scheduler 200, b) data stream(s) 832 to and from the RF chip 820, c) co-operation information exchange 834 between the schedulers 200, 210, or only from the second scheduler 200 to the first scheduler 210, d) lately available information 836 from a radio system required for the first scheduler 210 to perform reactive scheduling decisions (for instance, in case of conditional grants on the basis of if HARQ is needed or not), and e) lately available information 838 created inside the RF chip to finalize reactive scheduling decisions (for instance of conditional grants).

In one embodiment the communications between the second scheduler 200 and the first scheduler 210 and is arranged over a digital interface between BB chip and RF chip, such as the interface between BB IC 102 and RF IC 112 of FIG. 1. The first scheduler 210 is configured to perform reactive scheduling decisions 520 on the basis of information detected on this digital interface. The first scheduler 210 may be arranged to detect a status of a radio system 300a-c on the basis of information exchanged over such interface. One example of such digital interface is an interface specified Mobile Industry Processor Interface (MIPI) Alliance, referred also to as DigRF interface. Version 1.12 of the DigRF specification is currently available at http://www.mipi.org/docs/DigRF_Standard_v112.pdf. In a further embodiment the first scheduler 210 is arranged to extract operating times of a radio transceiver from messages transferred over the DigRF interface standardized. For instance, Chapter 4.3.4 provides details on strobe signals providing event timing information.

In some embodiments the first scheduler 210 is implemented outside radio system chip(s). The schedulers 200 and 210 may be arranged on a same chip 910, such as the SDR chip illustrated as in FIG. 9. An RF chip 920 comprising the actual RF hardware comprises an entity to implement final timing control and accurately control RF pipes, such as a hardware latcher 922. In this setup, communication links exist for: a) protocol level scheduling 830 between SDR radios and the second scheduler 200, b) data stream(s) 832 to and from the RF chip 920, c) co-operation information exchange 834 between schedulers, d) lately available information 836 from radio needed to perform reactive scheduling decisions (for instance, in case of conditional grants on the basis of if HARQ is needed or not) e) lately available information 838 created inside the RF chip for the first scheduler 210 to perform reactive scheduling decisions, f) RF configuration information 930 based on decision of the first scheduler 210 g) implementing 932 the correct configuration for the RF pipes.

Figure 9:
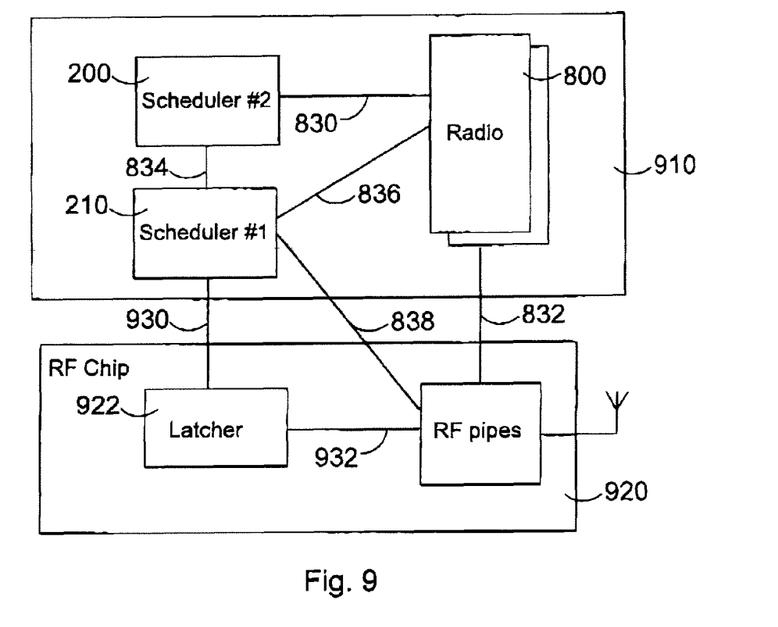

In the above examples the first scheduler 210 is shown to receive information from both the SDR radios 800 and the RF part(s). It is to be noted that such division does not necessarily exist, but is shown to illustrate that, depending on the system partitioning, the information for the scheduling decisions may be arranged from an RF chip, an SDR chip, and/or both from an RF chip and an SDR chip.

In an embodiment the first scheduler 210 is connected to a co-existence interface of a radio system chip and configured to control 530 a co-existence interface to realize a reactive scheduling decision. It is possible to use legacy coexistence interfaces together with SDR resource management and scheduling framework. For instance, some third-party radio chipsets have a co-existence interface, which may work nearly in real time, informing of activities only a few tens of microseconds beforehand. It is now easier to use these third-party chipsets directly as a part of SDR radio computer. In other words, the interoperability of third-party radios and SDR radios can be controlled by using a single, holistic scheme.

Figure 10:
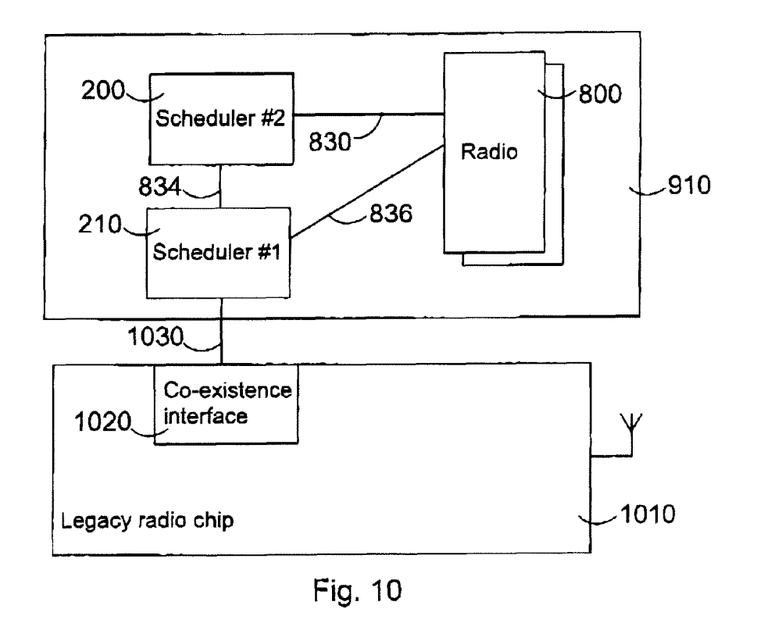

FIG. 10 illustrates an embodiment addressing co-existence of non-SDR and SDR radios. The second scheduler 200 and the first scheduler 210 are located on an SDR chip 910, and the first scheduler 210 controls the legacy co-existence information of a third-party radio chip 1020. In this setup, communication links exist for: a) protocol level scheduling 830 between SDR radio systems 800 and the second scheduler 200, b) co-operation information exchange 834 between the schedulers, c) the first scheduler 210 controlling 1030 a coexistence interface 1020 of a legacy radio chip 1010, and d) lately available information 836 from SDR systems 800.

Figure 11:
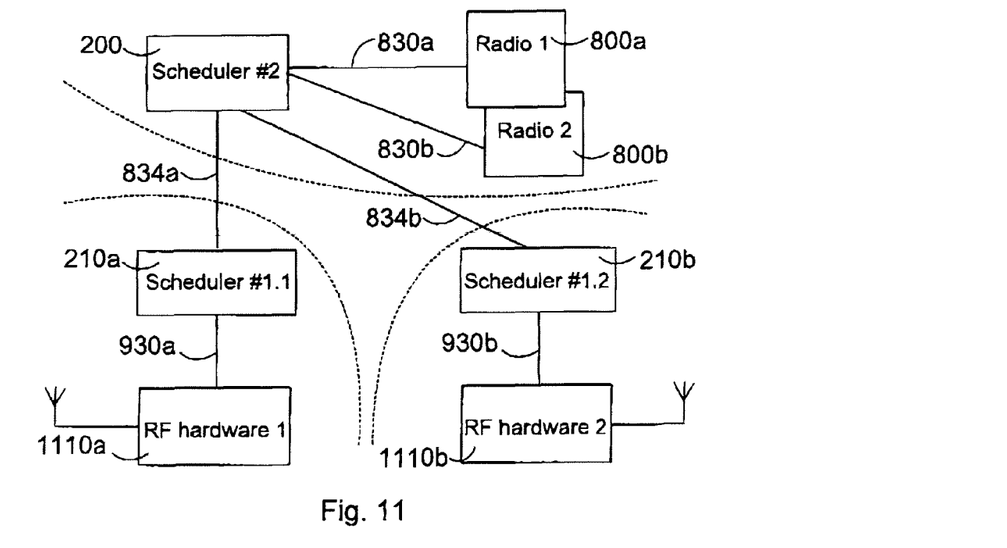

FIG. 11 illustrates an example of communication between schedulers in a system which have its RF hardware on two separate chips. In this case, both chips have a dedicated first scheduler 210a, 210b. There are three different logical interfaces: (a) protocol level scheduling interfaces 830a, 830b used by radios 800a, 800b to communicate their scheduling requests to the second scheduler 200 and get scheduling results back, (b) an inter-scheduler interfaces 834a, 834b used to communicate scheduling results from the second scheduler 200 to the first schedulers 210a,b, and (c) first scheduler-RF HW interfaces 930a, 930b used by the first schedulers 210a,b to configure the RF hardware 1110a and 1110b. The dashed lines illustrate chip boundaries.

Figure 12:
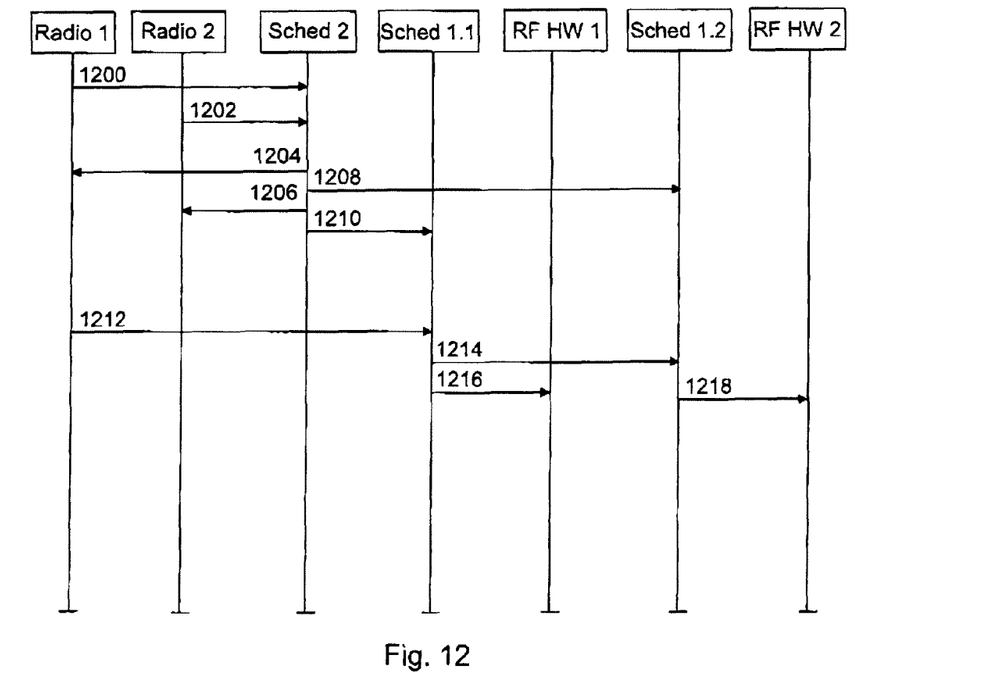
FIG. 12 is a signaling chart illustrating co-operations between entities of FIG. 11.

FIG. 12 illustrates an example how entities of FIG. 11 may be arranged to co-operate to perform multiradio scheduling. The procedure can be divided into three main phases: In the first phase, the radios 800a,b send their scheduling requests 1200, 1202 to second scheduler 200. When the second scheduler 200 has received schedule requests from every radio, it calculates the multiradio schedule. There is time left until the transmissions take place for the second scheduler 200 to use techniques such as delaying or modifying schedule requests or selecting a non-conflicting one from several possibilities. In this example, a higher-priority radio 1 800a requests 1200 a conditional access because it does not know at the time of sending the scheduling request if RF access is needed or not.

After the multiradio schedule is calculated, the second scheduler 200 sends responses to the radios 1204, 1206 and to the first schedulers 210a,b; 1208; 1210 in phase 2. In this example, the second scheduler 200 has detected a conflict between requests of radio 1 800a and radio 2 800b, and a prioritized conditional grant 1204 is sent to the radio 1 to indicate that the resources are guaranteed if needed. A secondary conditional grant 1206 is sent to the radio 2 to indicate that resources are available if the radio 1 800a does not need them. In the third phase, the radio 1 sends a condition indication 1212 when it knows if it needs the prioritized conditional slot or not. This indication 1212 is detected by the first scheduler 210a of the radio 1, which may forward the indication 1214 to the first scheduler 210b of the radio 2. Alternatively the second scheduler 200b detects the indication 1212 from the radio 1 800a. These first schedulers 210a, 210b realize the final scheduling 1216, 1218, for example by allowing or blocking RF hardware to perform transmission.

Figure 13:
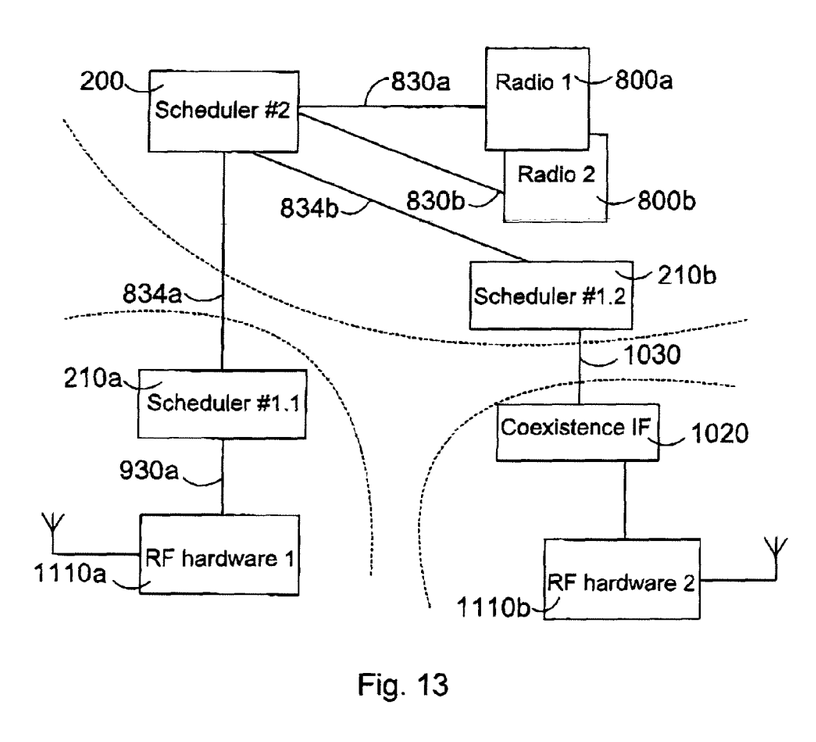
FIG. 13 illustrates an apparatus according to an embodiment.

FIG. 13 illustrates an example where the RF hardware 1110b of a radio 2 800b is implemented as a legacy chip with a coexistence interface 1020. The dashed lines again illustrate chip boundaries. In this example, the first scheduler 210b is located on the same chip with the second scheduler 200, for instance as a separate software entity. The first scheduler 210b obtains 834 the scheduling results from the second scheduler 200. The scheduling decisions for the radio 2 800*b* are realized by the first scheduler 210*b* controlling 1310 the coexistence interface 1020 of the legacy chip, which allows it for example to block the transmission when during a conflicting higher radio operation. The connection 1030 in FIG. 13 represents a logical connection from first scheduler 210*b* to the co-existence interface 1020, it may be implemented as dedicated signal wires, shared system bus or by any other suitable means. Signaling between the entities may follow the principles similar to the signaling presented in previous example in FIG. 12.

It is to be noted that the above features represent only some examples of available ways to implement the present features related to arranging a two-fold scheduling service. Various modifications can be made and some of the steps may be carried out in a different order.

It will be obvious to a person skilled in the art that as technology advances, the inventive concept can be implemented in various ways. The invention and its embodiments are not limited to the examples described above but may vary within the scope of the claims. The features of the embodiments described herein may be combined in all possible combinations of methods, apparatuses, and computer program products. The combinations of claim elements as stated in the claims can be changed in a number of different ways and still be within the scope of various embodiments of the invention.

The invention claimed is:

1. An apparatus, comprising:
a first scheduler, and
a second scheduler comprising a scheduling service controller comprising protocol software,
wherein the first scheduler and the second scheduler are operatively connected,
the second scheduler is configured to perform a proactive scheduling decision on a basis of radio access system protocol requirements from at least two radio systems of a wireless communications terminal device, the proactive scheduling decision being carried out by solving a radio system interoperability conflict using the scheduling service controller, and
the first scheduler is configured to perform a reactive scheduling decision on a basis of information on the proactive scheduling decision from the second scheduler and on a basis of information from a radio access system device representing a baseband computation and low level control.

2. The apparatus according to claim 1, wherein the first scheduler is configured to perform the reactive level scheduling decision on a basis of detecting a decision of at least one radio to use a radio resource allocated by the radio access system protocol requirements to the at least one radio system.

3. The apparatus according to claim 2, wherein the second scheduler is configured to grant a radio time slot for a first radio system, and the first scheduler is configured to grant the radio time slot for a second radio system in response to detecting that the first radio system is not going to use the radio time slot.

4. The apparatus according to claim 3, wherein the second scheduler is configured to inform the first scheduler of a conditional grant decision to grant the radio time slot to the first radio system, and the first scheduler is configured to, in response to receiving information on the conditional grant decision, determine if the first radio system is going to use the radio time slot.

5. The apparatus according to claim 1, wherein the first scheduler is configured to perform reactive scheduling decisions for at least one radio system which cannot predict behavior of the at least one radio system in advance or send scheduling requests to the second scheduler.

6. The apparatus according to claim 1, wherein the first scheduler is provided on a radio frequency chip and the second scheduler is provided on a baseband chip, and the first scheduler is configured to perform reactive scheduling decisions on the basis of information detected on a digital interface between the radio frequency chip and the baseband chip.

7. The apparatus according to claim 1, wherein the second scheduler is configured to receive a scheduling request over a control interface from at least one radio system, and the second scheduler is configured to perform the proactive scheduling decision on the basis of scheduling parameters of the scheduling request.

8. The apparatus according to claim 1, wherein the apparatus is a mobile communications terminal device.

9. The apparatus according to claim 1, wherein the apparatus is a chipset for a mobile communications device.

10. A method, comprising:
performing, by a second scheduler for a wireless communications terminal device, a proactive scheduling decision on a basis of radio access system protocol requirements from at least two radio systems of the wireless communications terminal device, the proactive scheduling decision being carried out by solving a radio system interoperability conflict using a scheduling service controller, and
sending information on the proactive scheduling decision to a first scheduler, and performing a reactive scheduling decision on a basis of the proactive scheduling decision information from the second scheduler and on a basis of information from a radio access system device representing a baseband computation and low level control.

11. The method according to claim 10, wherein the first scheduler performs the reactive scheduling decision on a basis of detecting a decision of at least one radio system to use a radio resource allocated by the radio access system protocol requirements to the at least one radio system.

12. The method according to claim 10, wherein the second scheduler grants a radio time slot for a first radio system, and the first scheduler grants the radio time slot for a second radio system in response to detecting that the first radio system is not going to use the radio time slot.

13. The method according to claim 12, wherein the second scheduler informs the first scheduler of a conditional grant decision to grant the radio time slot to the first radio system, and the first scheduler, in response to receiving information on the conditional grant decision, determines if the first radio system is going to use the radio time slot.

14. The method according to claim 10, wherein the first scheduler performs reactive scheduling decisions on a basis of messages comprising time information over a digital interface between a radio frequency chip and a baseband chip.

15. An apparatus, comprising at least one processor and at least one memory storing computer program code, the at least one memory and the computer program code being configured, with at least one processor, to cause the apparatus at least to:
perform, by a second scheduler, a proactive scheduling decision on a basis of radio access system protocol requirements from at least two radio systems of the wireless communications terminal device, and
perform, by a first scheduler, a reactive scheduling decision on a basis of information on the reactive scheduling decision from the radio access system protocol requirements.

16. A non-transitory computer readable storage medium, comprising one or more sequences of one or more instructions which, when executed by one or more processors of an apparatus, cause the apparatus to at least perform, by a second scheduler, a proactive scheduling decision on a basis of radio access system protocol requirements from at least two radio systems of a wireless communications terminal device, send information on the proactive scheduling decision to a first scheduler configured to perform a reactive scheduling decision on a basis of information on the proactive scheduling decision from the radio access system protocol requirements.

17. The apparatus according to claim 1, wherein the first scheduler is configured to inform the second scheduler on scheduling decisions performed by the first scheduler.

18. The method according to claim 10, further comprising the first scheduler informing the second scheduler on scheduling decisions performed by the first scheduler.

19. The apparatus according to claim 15, wherein the at least one memory and the computer program code cause the first scheduler to inform the second scheduler on scheduling decisions performed by the first scheduler.

20. The non-transitory computer readable storage medium according to claim 16, wherein the one or more processors cause the first scheduler to inform the second scheduler on scheduling decisions performed by the first scheduler.

* * * * *

UNITED STATES PATENT AND TRADEMARK OFFICE
CERTIFICATE OF CORRECTION

PATENT NO. : 8,559,383 B2
APPLICATION NO. : 12/622593
DATED : October 15, 2013
INVENTOR(S) : Tommi J. Zetterman et al.

It is certified that error appears in the above-identified patent and that said Letters Patent is hereby corrected as shown below:

In the Claims

In Claim 1:

Column 15, lines 35-47:

"the second scheduler is configured to perform a proactive scheduling decision on a basis of radio access system protocol requirements from at least two radio systems of a wireless communications terminal device, the proactive scheduling decision being carried out by solving a radio system interoperability conflict using the scheduling service controller, and the first scheduler is configured to perform a reactive scheduling decision on a basis of information on the proactive scheduling decision from the second scheduler and on a basis of information from a radio access system device representing a baseband computation and low level control" should be deleted, and --the second scheduler is configured to perform proactive scheduling decisions by predicting radio system interoperability conflicts between at least two radio systems of a wireless communications terminal device based on the radio access system protocol requirements of each of the at least two radio systems and scheduling timeslots for radio operations for each of the at least two radio systems to avoid the predicted conflicts using the scheduling service controller, and the first scheduler is configured to perform reactive scheduling decisions on a basis of information on the proactive scheduling decisions from the second scheduler and on a basis of information from a radio access system device representing a baseband computation and low level control-- should be inserted.

In Claim 10:

Column 16, lines 21-34:

"performing, by a second scheduler for a wireless communications terminal device, a proactive scheduling decision on a basis of radio access system protocol requirements from at least two radio systems of the wireless communications terminal device, the proactive scheduling decision being carried out by solving a radio system interoperability conflict using a scheduling service controller, and sending information on the proactive scheduling decision to a first scheduler, and performing a reactive scheduling decision on a basis of the proactive scheduling decision information from the Signed and Sealed this
Twenty-eighth Day of January, 2014

Michelle K. Lee
*Deputy Director of the United States Patent and Trademark Office*

CERTIFICATE OF CORRECTION (continued)
U.S. Pat. No. 8,559,383 B2 second scheduler and on a basis of information from a radio access system device representing a baseband computation and low level control" should be deleted, and --performing, by a second scheduler for a wireless communications terminal device, proactive scheduling decisions by predicting radio system interoperability conflicts between at least two radio systems of the wireless communications terminal device based on the radio access system protocol requirements of each of the at least two radio systems and scheduling timeslots for radio operations for each of the at least two radio systems to avoid the predicted conflicts using a scheduling service controller, and sending information on the proactive scheduling decisions to a first scheduler, and performing reactive scheduling decisions on a basis of the proactive scheduling decision information from the second scheduler and on a basis of information from a radio access system device representing a baseband computation and low level control-- should be inserted.

In Claim 15:

Column 16, lines 60-67:

"perform, by a second scheduler, a proactive scheduling decision on a basis of radio access system protocol requirements from at least two radio systems of the wireless communications terminal device, and perform, by a first scheduler, a reactive scheduling decision on a basis of information on the reactive scheduling decision from the radio access system protocol requirements" should be deleted, and --perform, by a second scheduler, proactive scheduling decisions by predicting radio system interoperability conflicts between at least two radio systems of a wireless communications terminal device based on the radio access system protocol requirements of each of the at least two radio systems and scheduling timeslots for radio operations for each of the at least two radio systems to avoid the predicted conflicts using a scheduling service controller, and perform, by a first scheduler, reactive scheduling decisions on a basis of information on the reactive scheduling decisions from the radio access system protocol requirements-- should be inserted.

In Claim 16:

Column 17, lines 5-13:

"perform, by a second scheduler, a proactive scheduling decision on a basis of radio access system protocol requirements from at least two radio systems of a wireless communications terminal device, send information on the proactive scheduling decision to a first scheduler configured to perform a reactive scheduling decision on a basis of information on the proactive scheduling decision from the radio access system protocol requirements" should be deleted, and --perform, by a second scheduler, proactive scheduling decisions by predicting radio system interoperability conflicts between at least two radio systems of a wireless communications terminal device based on the radio access system protocol requirements of each of the at least two radio systems and scheduling timeslots for radio operations for each of the at least two radio systems to avoid the predicted conflicts using a scheduling service controller, send information on the proactive scheduling decisions to a first scheduler configured to perform reactive scheduling decisions on a basis of information on the proactive scheduling decisions from the radio access system protocol requirements-- should be inserted.